United States Patent
De Clercq et al.

(10) Patent No.: US 10,840,812 B2
(45) Date of Patent: Nov. 17, 2020

(54) FLYBACK CONVERTER FOR OPERATING ONE OR MORE LIGHTING MEANS, ASSOCIATED METHOD AND OPERATING DEVICE

(71) Applicant: TRIDONIC GMBH & CO KG, Dornbirn (AT)

(72) Inventors: Ludwig Erasmus De Clercq, Dornbirn (AT); Joan Ortega, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/344,899

(22) PCT Filed: Nov. 10, 2017

(86) PCT No.: PCT/EP2017/078911
§ 371 (c)(1),
(2) Date: Apr. 25, 2019

(87) PCT Pub. No.: WO2018/087302
PCT Pub. Date: May 17, 2018

(65) Prior Publication Data
US 2019/0267905 A1    Aug. 29, 2019

(30) Foreign Application Priority Data
Nov. 11, 2016 (DE) .................. 10 2016 222 161

(51) Int. Cl.
*H02M 3/335* (2006.01)
(52) U.S. Cl.
CPC ... *H02M 3/33523* (2013.01); *H02M 3/33592* (2013.01); *H02M 3/335* (2013.01)
(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS

| 2010/0110732 A1 | 5/2010 | Moyer et al. | |
| 2010/0328967 A1* | 12/2010 | Cody | H02M 3/3376 363/21.02 |

(Continued)

FOREIGN PATENT DOCUMENTS

| DE | 3705468 | 10/1987 |
| DE | 102014214746 | 1/2016 |
| WO | 2016113397 | 7/2016 |

OTHER PUBLICATIONS

German search report dated May 16, 2017 in co-pending German patent application 10 2016 222 161.2.

(Continued)

*Primary Examiner* — Bryan R Perez
(74) *Attorney, Agent, or Firm* — Andrus Intellectual Property Law

(57) ABSTRACT

A flyback converter (10) for operating one or more lighting means, wherein the flyback converter (10) has a transformer and the transformer is arranged between a primary side of the flyback converter (10) and a secondary side of the flyback converter (10), wherein the flyback converter (10) is configured, and wherein the flyback converter (10) has a current detection circuit (107) that is configured to detect the current flowing through the secondary side of the flyback converter (10). The current detection circuit (107) can have a current detection transformer (108, 109). The flyback converter (10) can be configured such that the current flowing through the secondary side of the flyback converter (10) flows in a negative direction at least some of the time.

12 Claims, 4 Drawing Sheets

(58) Field of Classification Search
CPC ......... H02M 3/33507; H02M 3/33592; H02M 3/33523; H02M 3/3353; H02M 3/33569
See application file for complete search history.

(56) References Cited

U.S. PATENT DOCUMENTS

| | | | |
|---|---|---|---|
| 2011/0199793 A1 | 8/2011 | Kuang et al. | |
| 2014/0003104 A1* | 1/2014 | Greenfeld | H02M 7/04 363/84 |
| 2014/0232282 A1* | 8/2014 | Rooijackers | H02M 3/33523 315/200 R |

OTHER PUBLICATIONS

PCT search report dated Mar. 19, 2018 in parent PCT application PCT/EP2017/078911.

\* cited by examiner

FLYBACK CONVERTER FOR OPERATING ONE OR MORE LIGHTING MEANS, ASSOCIATED METHOD AND OPERATING DEVICE

CROSS REFERENCE TO RELATED APPLICATIONS

The present application is the U.S. national stage application of international application PCT/EP2017/078911 filed Nov. 10, 2017, which international application was published on May 17, 2018 as international publication WO 2018/087302 A1. The international application claims priority to German patent application 10 2016 222 161.2 filed Nov. 11, 2016.

FIELD OF THE INVENTION

The present invention relates to a flyback converter for operating one or more lighting means, a method for operating a flyback converter for operating one or more lighting means and an operating device for operating one or more lighting means. The one or more lighting means comprise e.g. one or more light emitting diodes (LEDs).

BACKGROUND OF THE INVENTION

Flyback converters are a matter of common knowledge. They are generally designed to convert the direct current of a first voltage level (i.e. input current) into the direct current of a second voltage level (i.e. output current). Depending on the configuration and field of application the input current can be lower or higher than the output current. Flyback converters are used for the operation of loads, or for supplying loads with current. The present invention is aimed at lighting means as loads.

In the case of flyback converters it is important to enable the broadest possible spectrum of the output current. This is of major importance, in particular in the area of lighting means (e.g. LEDs), since the lighting properties of the lighting means can be changed in their operation (e.g. by dimming). For example, the level of the output current also changes depending on whether the lighting means is brightened or dimmed.

SUMMARY OF THE INVENTION

Hence, the present invention addresses the problem of facilitating an operation of one or more lighting means with the broadest possible spectrum of the current provided to the one or more lighting means.

This problem is solved in accordance with the invention by the features described herein.

According to one aspect of the present invention, a flyback converter for operating one or more lighting means is provided, wherein the flyback converter has a transformer and the transformer is arranged between a primary side of the flyback converter and the secondary side of the flyback converter, and wherein the flyback converter has a current detection circuit, that is configured to detect the current flowing through the secondary side of the flyback converter.

According to one aspect of the present invention, the flyback converter can be configured such that the current flowing through the secondary side of the flyback converter flows in a negative direction at least some of the time.

The flyback converter can be configured to operate in a first operating mode or in a second operating mode, wherein the first operating mode begins with a conducting phase and ends with a blocking phase, wherein in the blocking phase the current flowing through the secondary side of the flyback converter drops towards zero, and wherein in the second operating mode of the flyback converter the current flowing through the secondary side of the flyback converter flows in a negative direction at least some of the time.

According to a further aspect of the present invention, a flyback converter for operating one or more lighting means is provided, wherein the flyback converter is configured to be operated in a first operating mode or in a second operating mode, wherein the first operating mode is a boundary conduction mode, BCM mode, and wherein in the second operating mode of the flyback converter the current flowing through the secondary side of the flyback converter flows in a negative direction at least some of the time.

According to one embodiment, the flyback converter has a transformer and the transformer is arranged between a primary side of the flyback converter and the secondary side of the flyback converter.

According to one embodiment, the flyback converter has a current detection circuit that is configured to detect the current flowing through the secondary side of the flyback converter.

According to one embodiment, the current detection circuit has a current detection transformer that is preferably configured as a current transformer.

According to one embodiment, the flyback converter is configured to switch from the first operating mode to the second operating mode when the current flowing through the secondary side of the flyback converter reaches the zero line.

According to one embodiment, the flyback converter is configured to switch from the first operating mode to the third operating mode when the current flowing through the secondary side of the flyback converter reaches the zero line.

According to one embodiment, in the third operating mode the current flowing through the secondary side of the flyback converter flows at least once first in the negative direction, then the current flowing through the secondary side of the flyback converter increases in the second operating mode and subsequently drops towards zero.

According to one embodiment, the current flowing through the secondary side of the flyback converter oscillates in the third operating mode.

According to one embodiment, the current flowing through the secondary side of the flyback converter flows in the second operating mode up to a lower limit in the negative direction and/or when the flyback converter has been operated for a predetermined period in the second operating mode.

According to one embodiment, the flyback converter is configured to switch from the third operating mode to the first operating mode when the flyback converter has been operated for a predetermined period in the second operating mode and/or when the current flowing through the secondary side of the flyback converter has reached a predetermined number of oscillation cycles.

According to one embodiment, the current flowing through the secondary side of the flyback convert flows first in the negative direction in an oscillation cycle, then the current flowing through the secondary side of the flyback converter increases and subsequently drops towards zero.

According to one embodiment, the flyback converter has a secondary side and a primary side, wherein the primary side has a primary side switch and the secondary side has a secondary side switch or a diode.

According to one embodiment, the flyback converter has a transformer and the transformer is arranged between a primary side of the flyback converter and the secondary side of the flyback converter; the flyback converter is configured such that by switching on the primary side switch on the primary side and further by switching off the secondary side switch or deactivating the diode on the secondary side current flows from a voltage source or externally through the primary side to the transformer and the transformer is charged; and the flyback converter is configured such that by switching off the primary side switch on the primary side and further by switching on the secondary side switch or activating the diode on the secondary side the flowing of the current from the voltage source or external current source through the primary side to the transformer and the charging of the transformer are terminated and the current charged in the transformer flows through the secondary side.

According to one embodiment, the flyback converter is configured such that the flyback converter switches to the first operating mode in response to a switching on of the primary side switch of the primary side of the flyback converter and further in the case of a switched off state of the secondary switch or in the case of a deactivated state of the diode of the secondary side of the flyback converter.

According to one embodiment, in the first operating mode the dropping of the current flowing through the secondary side of the flyback converter in the direction of the zero line is achieved by switching off the primary side switch of the primary side of the flyback converter and further by switching on the secondary side switch or by deactivating the diode on the secondary side of the flyback converter.

According to one embodiment, in the second or third operating mode the primary side switch of the primary side of the flyback converter is in a switched off state.

According to one embodiment, the flyback converter has a current detection circuit that is configured to detect the current flowing through the secondary side of the flyback converter.

According to one embodiment, the current detection circuit is configured in the detection of the current flowing through the secondary side of the flyback converter to feed in an offset current and take it into consideration in the current detection.

According to one embodiment, the flyback converter is configured such that the current flowing through the secondary side of the flyback converter is provided for operating the one or more lighting means.

According to one embodiment, the secondary side of the flyback converter is configured to be connectable to the one or more lighting means and in the presence of a connection to the one or more lighting means the secondary side of the flyback converter is configured to supply to the one or more lighting means with the current flowing through the secondary side of the flyback converter.

According to one embodiment, the current detection transformer is designed such that that it can also work in linear operation in the case of maximum power output and/or maximum output current through the lighting means and cannot go into or close to the saturation region.

According to one embodiment, the one or more lighting means comprise one or more light emitting diodes, LEDs.

According to one aspect of the present invention, a method for operating a flyback converter is provided that is configured for operating one or more lighting means, wherein the method comprises the step that the current flowing through the secondary side of the flyback converter (10) is detected.

According to one aspect of the present invention, the current flowing through the secondary side of the flyback converter can flow in a negative direction at least some of the time.

According to a further aspect of the present invention, a method for operating a flyback converter is provided that is configured for operating one or more lighting means, wherein the method has an operation of the flyback converter in a first operating mode or in a second or third operating mode, wherein the first operating mode is a boundary conduction mode, BCM mode, and wherein in the second or third operating mode of the flyback converter the current flowing through the secondary side of the flyback converter flows in a negative direction at least some of the time. In particular the method has one of the steps described herein, which are used to operate the flyback converter.

According to one aspect of the present invention, an operating device for operating one or more lighting means is provided, wherein the operating device has a flyback converter for operating the one or more lighting means. The flyback converter corresponds to the flyback converter described herein.

According to one embodiment, has a control system that is configured to control the flyback converter.

According to one embodiment, the control system controls the operation of the flyback converter in the first operating mode and in the second operating mode, controls a change in the operation of the flyback converter from the first operating mode to the second operating mode and a change in the operation of the flyback converter from the second operating mode to the first operating mode.

According to one embodiment, the control system controls the operation of the flyback converter in the first operating mode and in the third operating mode, controls a change in the operation of the flyback converter from the first operating mode to the second operating mode and a change in the operation of the flyback converter from the third operating mode to the first operating mode.

The control system can control the switching on and switching off of the secondary side switch by means of a control circuit, which is preferably designed to be galvanically isolated.

According to one embodiment, the current detection transformer can be formed with the first winding and the second winding for example by a transformer coil without the core.

By means of the present invention as outlined above and subsequently described in greater detail an operation of one or more lighting means with the broadest possible spectrum of the current provided to the one or more lighting means is made possible. In addition, the accuracy with respect to the range of the current range to be output by the flyback converter is improved.

DETAILED DESCRIPTION

Figure 1:
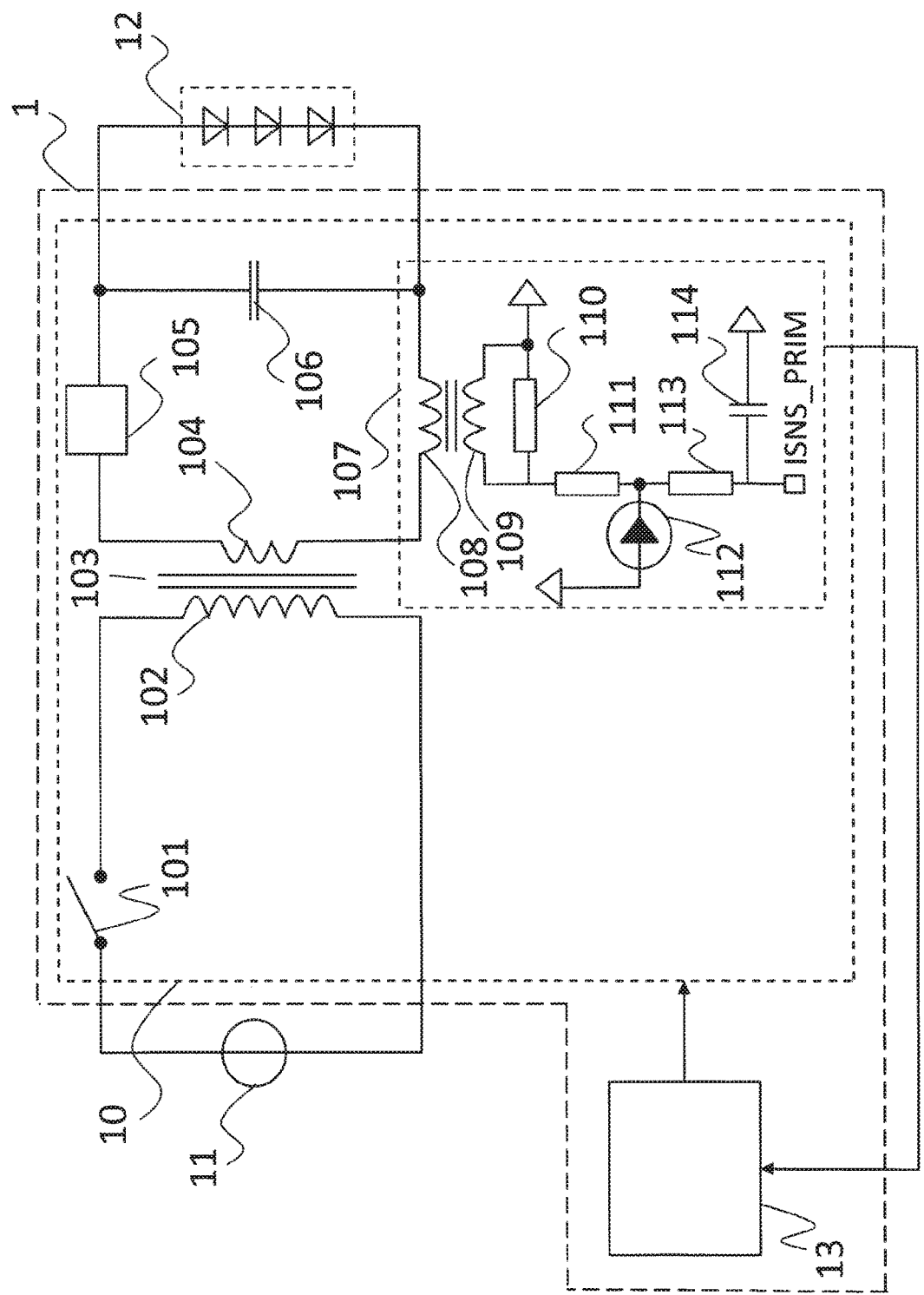
FIG. 1 shows an embodiment of an operating device for operation of the lighting means according to one embodiment of the present invention.

Subsequently, components with the same or similar functions will be designated with the same reference numeral in the figures. In addition, it should be noted that that the embodiments explained here can be combined with one another unless a combination is explicitly excluded.

FIG. 1 shows an exemplary embodiment of an operating device 1 for operating one or more lighting means 12 according to one embodiment of the present invention.

According to one embodiment the one or more lighting means 12 comprise one or more light emitting diodes (LEDs). The LEDs 12 can be designed differently, and the present invention is not restricted to any specific embodiment of the LEDs 12. According to one embodiment, the LEDs 12 comprise inorganic and/or organic LEDs. The arrangement of the LEDs 12 can be configured in different ways. Thus, the LEDs 12 according to one embodiment are series connected, while according to a further embodiment the LEDs 12 are parallel connected. According to a further embodiment the LEDs 12 interconnected in more complex arrangements, for example in several series circuits connected to one another in parallel. In FIG. 1 three lighting means 12 are shown by way of example, e.g. LEDs 12. However, the present invention is not restricted to this example and permits the use of any number of lighting means 12 such as e.g. LEDs 12, i.e. the use of at least one lighting means 12 (e.g. at least one LED).

The operating device 1 or the operating circuit 1 is used for the operation of the one or more lighting means 12 (e.g. LEDs). In particular the operating device 1 is used to supply the one or more lighting means 12 such as e.g. LEDs with current. The operating device 1 is supplied with a supply voltage from a voltage source 11 or external current source 11. The supply voltage is for example a direct current voltage or rectified alternating voltage. According to one embodiment, the operating device comprises a power factor correction circuit (not shown), which provides the supply voltage.

For the provision of the current obtained from the voltage source 11 or external current source 11 the operating device 1 or the operating circuit 1 has a flyback converter 10 as a converter. The flyback converter 10 is configured to convert the input current, which is received from the voltage source 11 or external current source 11 and has a first voltage level, into an output current, which flows on the secondary side, of a second voltage level. The output current is supplied to the one or more to the one or more lighting means 12, and the one or more lighting means 12 are operated with the supplied output current of the flyback converter 10.

The flyback converter 10 can have different designs, e.g. it can also be a synchronous flyback converter. In FIG. 1 a general circuit of a flyback converter is shown by way of example, which can also be understood as a principle circuit. This illustrates that the concrete construction of the flyback converter 10 which is used in accordance with the present invention, is quite variable, i.e. can be supplemented with corresponding further components as required.

In general, the flyback converter 10 in accordance with the present embodiment has a primary side 101, 102 and a secondary side 104 to 107. The primary side 101, 102 in accordance with the present embodiment comprises a primary side (first) switch 101, which is configured to control the current flow through the primary side 101, 103, and has a primary side winding 102. The secondary side 104 to 107 comprises in accordance with the present embodiment a further, secondary side winding 104, a secondary side (second) switch 105 or a diode 105, which is configured to control the current flow through the secondary side 104 to 107, a capacitor 106 and a current detection circuit 107. The primary side winding 102 and the secondary side winding 104, with the transformer core 103, form a transformer of the flyback converter, via which current from the primary side 101, 102 is transferred to the secondary side 104 to 107. In so doing, the primary side winding 102 and the secondary side winding 104 are galvanically isolated and magnetically coupled (magnetic coupling through the transformer core 103). The primary side 101, 102 receives the current from the voltage source 11 or external power supply 11. The output current of the secondary side 104 to 107 is supplied to the one or more lighting means (e.g. LEDs) 12.

The flyback converter 10 works in two phases. In the first phase, which is also referred to as the conducting phase, the primary side switch 101 is switched on (i.e. the switch 101 is closed and conductive). Thus the current can flow through the primary side 101, 102. As far as the secondary side 104 to 107 is concerned, no current flows through it in the first phase, since in the first phase the switch 105, which is used to block the secondary side 104 to 107, is switched off (i.e. open and not conductive) or, if not a switch 105, but rather a diode 105 is used to block of the secondary side 104 to 107, the diode 105 is deactivated. In the first phase, the secondary side winding 104 is currentless, and a magnetic voltage builds up in the transformer core 103 and its air gap between the primary side winding 102 and the secondary side winding 104. In the first phase, there is no energy transfer from the primary side 101, 102 to the secondary side 104 to 107. The current, which in the first phase is supplied to the primary side 101, 102 of the flyback converter 10, is stored in the transformer, which comprises the primary side winding 102 and the secondary side winding 104. In particular the energy or the current is stored in the magnetic field of the transformer core 103 developed between the two windings 102, 104.

In the second phase, which is also referred to as the blocking phase, the primary side switch 101 is switched off (i.e. the switch 101 is opened and is not conductive). Thus the primary side 101, 102 does not take any current from the voltage source 11 or external current source 11. Instead, the secondary side switch 105 is switched on (i.e. the switch 105 is closed and is conductive) or, if no switch 15 is used on the secondary side 104 to 107, but rather the diode 105 is used, the diode 105 is activated. As a result, the energy previously stored in the magnetic field of the transformer core 103 or the energy stored in the magnetic field of the transformer core 103 is discharged as current via the secondary side 104 to 107. In the process, the current proceeding from the magnetization of the transformer core 103 with the secondary winding 104 flows through the secondary side 104 to 107 and subsequently to the one or more lighting means 12. The capacitor 106 is recharged by the current flow on the secondary side 104 to 107 to the output voltage. If the second phase ends and the first phase begins anew, the one or more lighting means 12 are supplied with the current stored in the capacitor 106, as mentioned above.

To control the operation of the flyback converter 10 as efficiently and effectively as possible, the flyback converter 10 in accordance with the present embodiment also has a current detection circuit 107. The current detection circuit 107 detects the current flowing through the secondary side 104 to 107. The current detection circuit 107 in accordance with the present embodiment passes the detected current information to a control system or control circuit 13. The control system or control circuit 13 is in accordance with the present embodiment a component of the operating device 1 or of the operating circuit 1.

The passing of the current information to the control system 13 is indicated in FIG. 1 by the arrow, which leads from the current detection circuit 107 to the control system 13. The control system 13 then uses the obtained current information to control the operation of the flyback converter 10.

According to the present embodiment, the current flowing through the secondary side 104 to 107 is detected taking into consideration the offset current 112, which can be fed in within the current detection circuit 107. The current flowing through the current detection circuit 107 or the control information ISNS_PRIM, which is detected by the control system 13 and is taken into consideration in the operation of the flyback converter 10, thus corresponds e.g. to the actual value of the current flowing through the secondary side 104 to 107, which is increased by the value of the offset current. The consideration of the offset current 112 in the case of the value of the current to be passed to the control system 13 that flows through the secondary side 104 to 107 facilitates an adjustment of the value range of the variable to be detected to the detection range of the control system 13 and hence a more accurate control of the flyback converter 10.

FIG. 1 shows an exemplary embodiment of the current detection circuit 107. According to FIG. 1 the current detection circuit 107 has by way of example a current detection transformer 108, 109. Further alternative embodiments allow further suitable embodiments of the current detection circuit 107.

According to the present embodiment, the current detection circuit 107 has a current detection transformer 108, 109, which has a first winding 108 and a second winding 109. The current detection transformer 108, 109 is provided to detect the current flowing through the secondary side 104 to 107. The current detection transformer 108, 109 is preferably configured as a current transformer. When the current on the secondary side 104 to 107 of the flyback converter reaches a specified minimum value (e.g. zero value) a corresponding minimum quantity of the current is passed from the first winding 108 of the current detection transformer 108, 109 to the second winding 109 of the current detection transformer 108, 109. I.e., when current flows through the secondary side 104 to 107 of the flyback converter, a corresponding quantity of the current is also passed to the second winding 109 of the current detection transformer 108, 109 of the current detection circuit 107.

According to the present embodiment, the current detection circuit 107 further has a first resonator 110 (also called a terminating resistor or "burden resistor"), which is arranged parallel to the second winding 109. When current flows on the second winding 109, a voltage curve develops on the first resonator 110, wherein the voltage runs via the first resonator proportionally to the current through the second winding 109. The current value measured through the first resonator 110 thus corresponds to the actual detected current, which flows through the secondary side 104 to 107 of the flyback converter 10. Hence, taking into account the winding ratio of the first winding 108 to the second winding 108, the current flowing through the first winding 109 can be inferred with the assistance of the voltage over the first resonator 110.

Since, in accordance with the present embodiment the offset current is also taken into consideration, the current detection circuit 107 has a second resonator 111, which receives the voltage curve of the offset current 112 and supplies it to the first resonator 110, so that the first resonator 110 adds the offset current 112 to the actual detected current, which flows through the secondary side 104 to 107 of the flyback converter 10. The offset current 112 can for example be produced by an internal current source, which feeds the offset current 112 to the center of the second resonator 111 and third resonator 113, and hence shifts the amplitude of the current detected on the first resonator 110. In this way, an easier detection of the current can be made possible, since, through the offset current the detected current can be shifted to the value range of the control system 13. For example, by means of a positive offset current a partially negative current can be shifted to the positive value range.

In addition the current detection circuit 107 in accordance with the present embodiment has a capacity 114 that has a specified capacity value in order to present a low impedance with respect to random or hum voltages. The capacity 114 and the third resonator 113 can form a low pass, so that random or hum voltages do not have to be taken into consideration in the detection of the current flowing through the secondary side 104 to 107 of the flyback converter 10. The current detected on the first resonator 110, which reproduces the current flowing through the secondary side 104 to 107 of the flyback converter 10, is supplied to the control system 13 in the form of a current information ISNS_PRIM (see in FIG. 1 the arrow, which leads from the current detection circuit 107 to the control system 13).

The current detection transformer with the first winding 108 and the second winding 109 can for example also be formed by a transformer coil without the core. In this case the first winding 108 and the second winding 109 would each be configured as air coils, which are magnetically coupled to each other.

The control system 13 uses the current information ISNS_PRIM supplied to it about the current flowing through the secondary side 104 to 107 of the flyback converter 10 to control the operation of the flyback converter 10. In particular, the control system 13 determines which operating mode the flyback converter 10 is to be operated in. The control system 13 executes the control of the flyback converter 10 in accordance with the present embodiment by sending or transmitting corresponding control signals to the flyback converter 10. This is indicated in FIG. 1 by the arrow leading from the control system 13 to the flyback converter 10. The control system 13 controls the switching on and off of the primary side switch 101. In the process, a high frequency clocking of the primary side switch 101 occurs, wherein the durations of the conducting phase (the activation duration) and of the blocking phase (the deactivation duration) of the primary side switch 101 are controlled by the control system 13. Further, the control system 13 controls the switching on and off of the secondary side switch 105 or the activation and deactivation of the secondary side diode 105, when instead of the switch 105 a diode 105 is used to control the current flow through the secondary side 104 to 107 of the flyback converter 10. The control system 13 can control the switching on and off of the secondary side switch 105 by means of a drive circuit, which is preferably designed to be galvanically isolated. The drive circuit can for example have a drive transformer, or alternatively a level offset stage or at least a capacitor, to enable a galvanically isolated control of the secondary side switch 105 when the control system 13 is arranged on the primary side and hence primary side potential. The controlling and hence the switching on and off of the secondary side switch 105 by the control system 13 occurs just like the control of the switching on and off of the secondary side switch 105 with high frequency, for example in the range of 50 kHz to 200 kHz.

At least one switch of the switches 101, 105 of the flyback converter 10 is in accordance with further embodiments, which are combinable with the embodiments described herein, configured for example as a transistor, e.g. a bipolar transistor, an insulated gate bipolar transistor (IGBT), field effect transistor (FET) or metal-oxide-semiconductor field effect transistor (MOSFET).

As far as the design of the control system 13 is concerned, the present invention allows for different designs of the control system 13. Thus, e.g. the control system 13 according to one embodiment is an integrated semiconductor circuit or comprises an integrated semiconductor circuit. In accordance with further embodiments the control system 13 is designed as a processor, a microprocessor, a controller, a microcontroller, an application specific integrated circuit (ASIC) or a combination of the mentioned units.

The flyback converter 10 is configured to be operated in a first operating mode or in a second or third operating mode.

Figure 2:
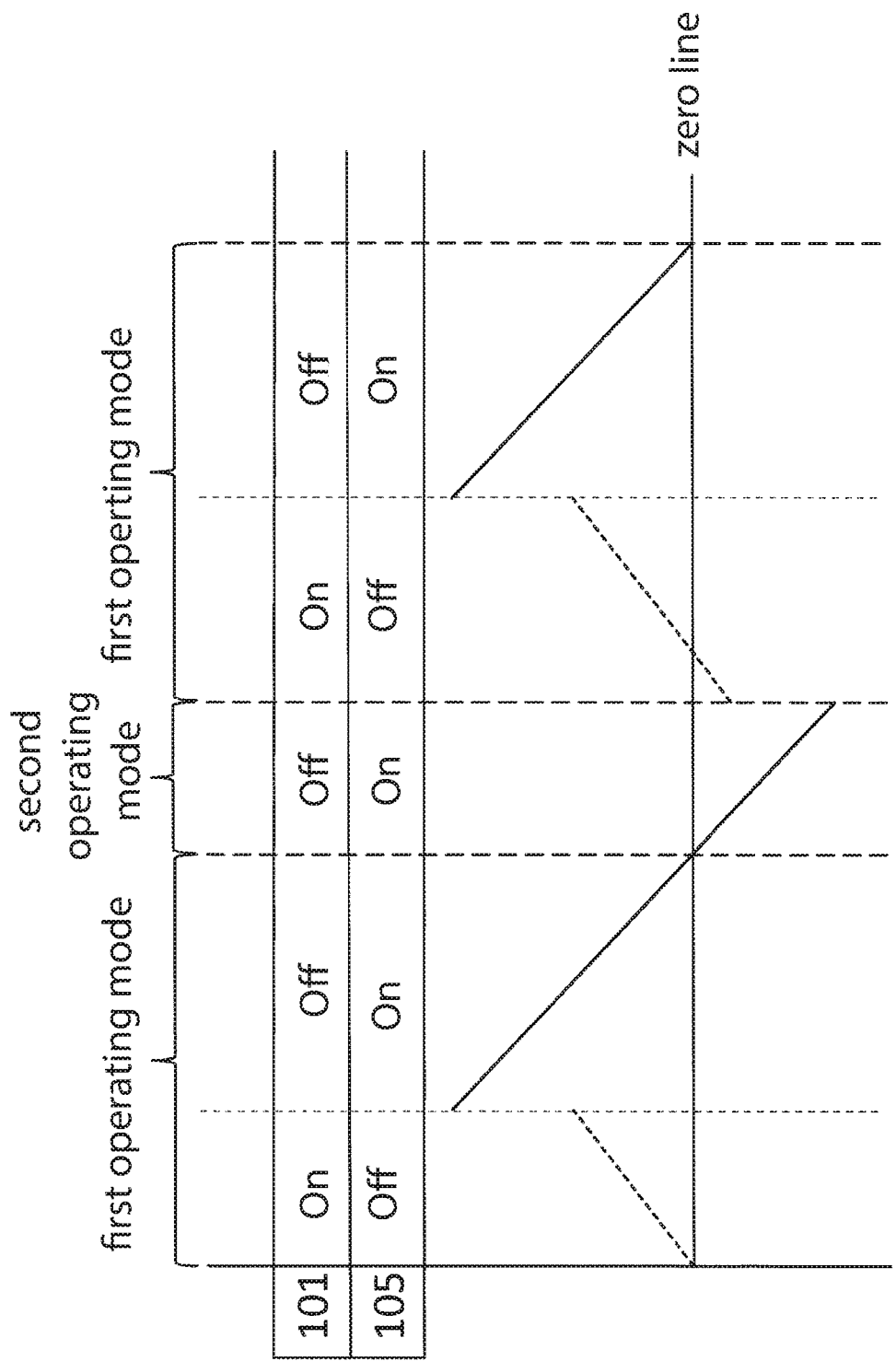
FIG. 2 shows an exemplary current curve through a flyback converter in two operating modes of the flyback converter according to one embodiment of the present invention.
Figure 3:
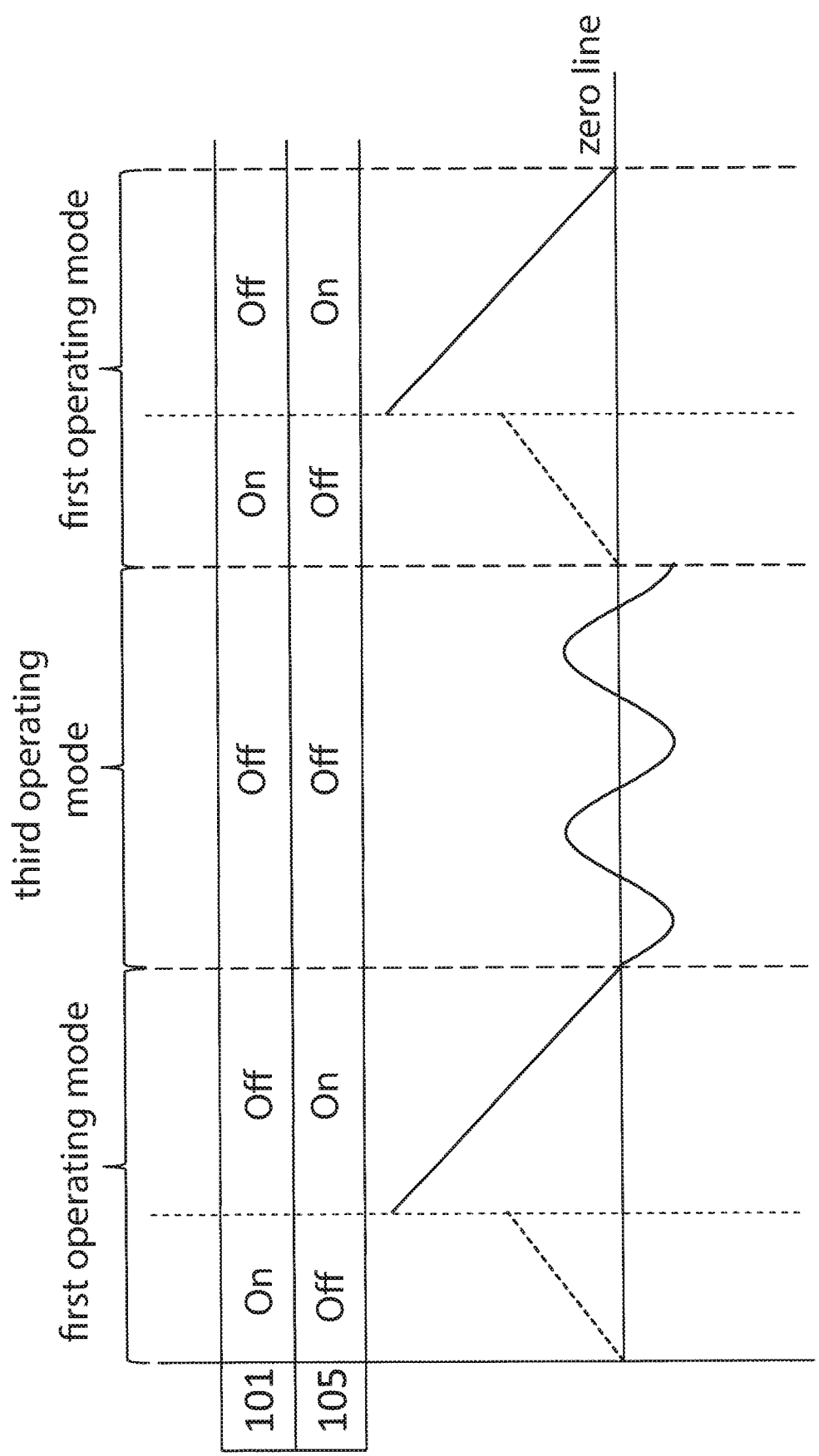
FIG. 3 shows an exemplary current curve through a flyback converter in two operating modes of the flyback converter according to one embodiment of the present invention.

The first operating mode of the flyback converter 10 starts with a conducting phase and ends with a blocking phase, wherein in the blocking phase the current flowing through the secondary side 104 to 107 of the flyback converter 10 drops towards zero. Subsequently, this operating mode will also be referred to as boundary conduction mode (BCM). BCM mode is a matter of common knowledge. In BCM mode, when the flyback converter 10 is in the conducting phase, the current value first increases from zero or the previous converted current value on the primary side 101, 102 of the flyback converter 10, since the primary side 101, 102 is supplied with current. For example, in the event of the first switching on of the primary side switch 101, thus the first conducting phase, at the beginning no current is flowing yet, the current is thus zero. After the end of a previous cycle, thus after the end of a blocking phase, the current flowing through the secondary side 104 to 107 of the flyback converter 10 can be unequal to zero, since a current flow is still present there. In this case, due to the existing magnetization of the transformer the current will take on a negative value when the primary side switch 101 is switched on, which corresponds to the previous current of the secondary side converted corresponding to the winding ratio. This is shown in FIGS. 2 and 3 by the broken lines. The solid lines of FIGS. 2 and 3 show the current curve on the secondary side 104 to 107 of the flyback converter 10. When the primary side switch 101 is switched off and the switch 105 on the secondary side 104 to 107 of the flyback converter is switched on or the diode 105 is activated, the blocking phase begins, in which the current flows through the secondary side 104 to 107 of the flyback converter 10. In BCM mode the level of the current on the secondary side 104 to 107 at the beginning of the blocking phase is twice that of an average current level. Since in the blocking phase the energy stored in the magnetic field of the transformer core 103 is expended, the current level of the secondary side 104 to 107 drops. The current flowing through the secondary side 104 to 107 of the flyback converter 10 drops towards zero, as can be seen in FIGS. 2 and 3 from the solid arrows of the first operating mode.

Hence BCM mode, which is the first operating mode of the flyback converter 10, is characterized in that the current flowing through the secondary side 104 to 107 in every cycle, which consists of a conducting phase and a blocking phase, in the blocking phase flows or drops from twice the average current level toward zero until the zero value or the zero line has been reached, and is at zero or is zero in the conducting phase.

In the first operating mode the control system 13 controls the switching on and off of the switch 101 on the primary side 101, 102 and on the secondary side 104 to 107 the switching on and off of the switch 105 or the activation and deactivation of the diode 105. For example, a predetermined duration can be provided at least for one of the phases (i.e. for the conducting phase and/or the blocking phase). The control circuit 13 then switches the phase in accordance with the respective predetermined duration, so that the flyback converter 10 is operated in the phase until the respective duration has lapsed.

According to a further embodiment, the control system takes into consideration a maximum limit or a maximum current level which the current flowing on the secondary side 104 to 107 is allowed to reach. Therewith the circuit 13 will have the conducting phase e.g. remain in force until the level of the current flowing there on the primary side has reached a value that is less than or equal to half of the maximum limit. The blocking phase will then begin on the secondary side 104 to 107 of the flyback converter 10 with a current level that is equal to or less than the maximum limit and will then remain in force until the current flowing through the secondary side 104 to 107 is zero.

The above described operation of the flyback converter 10 in the first operating mode or in BCM mode is shown in FIGS. 2 and 3. In FIGS. 2 and 3 the reference numeral 101 represents the primary side switch 101, which is switched on ("On") or switched off "Off". The reference numeral 105 indicates in FIGS. 2 and 3, depending on the design of the flyback converter 10, the secondary switch 105 or the secondary side diode 105. The specification "On" for reference numeral 105 indicates that the secondary side switch 105 is switched on or that the secondary side diode 105 is activated. The specification "Off" for reference numeral 105 indicates that the secondary side switch 105 is switched off or that the secondary side diode 105 is activated.

The second and also the third operating mode is configured such that the current flowing through the secondary side 104 to 107 flows in a negative direction at least some of the time, i.e. the current value is below the zero value or below the zero line and continues to drop. In both FIGS. 2 and 3 only the course of the current flowing through the secondary side 104 to 107 is specified for the second operating mode (see the solid lines, which refer to the second and third operating modes).

The operation of the flyback converter 10 can for example occur such that each cycle of the operation in the first operating mode or in BCM mode, each of which having a conducting phase and a blocking phase, is in each case followed by one of the second or third operating modes. In FIGS. 2 and 3 for reasons of simplicity and a better overview, in each case only one cycle is displayed with the associated conducting phase and the associated blocking phase for operation of the flyback converter 10 in the first operating mode, followed by an operation in the second or third operating mode, followed in turn by an operation in the first operating mode. According to one embodiment, an operation in the second or third operating mode would again follow, for reasons of simplicity and a better overview, this is not shown. The switch from the first operating mode to the second operating mode is controlled e.g. by the control system 13, wherein no switching of the primary side switch 101 or of the secondary side switch 105 is necessary. The switch from the first operating mode to the third operating mode is controlled e.g. by the control system 13, wherein here a switching off of the secondary side switch 105 occurs.

For clarification it should be noted that the first operating mode or BCM mode do not necessarily have to be concluded by a restarting of the primary side switch 101. According to this invention, the first operating mode or BCM mode only relates to an operation of the flyback converter 10, where the current on the secondary side 104 to 107 during the switch-off phase of the primary side switch 101 reaches the zero value or the zero line. According to the invention, the flyback converter can be operated such that each operation in the first operating mode or in BCM mode can be followed by an operation in the second or third operating mode for each cycle.

The operation of the flyback converter 10 in the first operating mode or in BCM mode can for example according to a further embodiment also continue for a predetermined number of cycles, each having a conducting phase and a blocking phase. In FIGS. 2 and 3, for reasons of simplicity and a better overview in each case only one cycle is shown with the associated conducting phase and the associated blocking phase for operation of the flyback converter 10 in the first operating mode. If the predetermined number of cycles in the first operating mode or in BCM mode has been reached, it is possible to switch from the first operating mode to the second operating mode. The switch from the first operating mode to the second operating mode is controlled e.g. by the control system 13. To this end the control system 13 is configured to determine whether the predetermined number of cycles has been reached in the first operating mode or in BCM mode. If so, the control system 13 controls the switch from the first operating mode to the second operating mode.

According to the embodiment of FIG. 2, the flyback converter 10 is operated in the second operating mode such that the current flowing through the secondary side 104 to 107 of the flyback converter 10 flows in the negative direction to a lower limit.

According to the embodiment of FIG. 2, the control system 13 controls the operation of the flyback converter 10 in the second operating mode by leaving the primary side switch 101 in a switched off state and on the secondary side 104 to 107 by leaving the switch 105 in the switched on state or by leaving the diode 105 in the activated state. Thus, in the second operating mode a type of continuation of the blocking phase of the first operating mode is performed. The control system 13 receives current information about the current flowing through the secondary side 104 to 107 and checks e.g. whether the current flowing through the secondary side 104 to 107 has reached the lower value. The current information is provided e.g. from the current detection circuit 107 or supplied to the control system 13. If the control system 13 determines that the lower limit has been reached, the control system 13 controls the switch from the second operating mode to the first operating mode an. The control system 13 can also determine the reaching of the lower limit indirectly, for example by measuring the current flowing through the secondary side 104 to 107 at one or more specific times, from this draw conclusions about the expected time when the lower limit will be reached. Hence, there can also be a time-controlled switch from the second to the first operating mode and hence a time-controlled restart of the primary side switch 101 can occur, for example depending on a current detection by means of current detection circuit 107, as will be explained on the basis of the example of FIG. 4.

The first operating mode starts with a conducting phase and ends with a blocking phase, as described above. If the first operating mode begins after switching from the second operating mode, after the end of a blocking phase, the current flowing through the secondary side 104 to 107 of the flyback converter 10 is unequal to zero, since a current flow is still present. In this case, due to the existing magnetization of the transformer the current will take on a negative value when the primary side switch 101 is switched on, which corresponds to the converted current of the secondary side corresponding to the winding ratio.

The control of the switch from the second operating mode to the first operating mode occurs according to the embodiment of FIG. 2 by switching on the primary side switch 101 and on the secondary side 104 to 107 of the flyback converter 10 by a switching off of the secondary side switch 105 or by a deactivation of the secondary side diode 105. As shown in FIG. 2, the current level of the current of the primary side 101, 102 of the flyback converter 10 is first negative, since the blocking phase has been "extended" by the second operating mode.

FIG. 3 shows an alternative operation to the embodiment of FIG. 2 of the flyback converter 10 in the third operating mode. In the process, the flyback converter 10 according to the embodiment of FIG. 3 in the third operating mode is operated such that the current flowing through the secondary side 104 to 107 of the flyback converter 10 oscillates. I.e. the current flowing through the secondary side 104 to 107 of the flyback converter 10 flows first in the negative direction, then increases, wherein during the increase the current reaches a positive value, and subsequently drops towards zero. It should be noted here that the secondary side current in this third operating mode is very low, since only one current can flow through parasitic elements. As an alternative to the current flow, in this operating mode the oscillating voltage at a point of the secondary side 104 to 107 can also be monitored.

According to the embodiment of FIG. 3 the control system 13 also controls the operation of the flyback converter 10 in the third operating mode. To this end, the control system controls a leaving of the primary side switch 101 in a switched off state and on the secondary side 104 to 107 a switching off of the switch 105 or a deactivation of the diode 105.

According to the embodiment of FIG. 3 the flyback converter 10 is operated in the third operating mode until a predetermined duration has lapsed or a specified state of the oscillation cycles is reached, for example the zero crossing of the voltage or of the current after the nth oscillation cycle. The predetermined duration is predefined according to a further embodiment e.g. by a predetermined number of oscillation cycles.

The control system 13 is hence configured to control the switch in the third operating mode and to check whether the predetermined duration has lapsed. Once the predetermined duration has lapsed, the control system 13 controls the switch from the third operating mode to the first operating mode.

Once the predetermined duration has been predefined by a predetermined number of oscillation cycles, the control system 13 tracks the current flowing through the secondary side 104 to 107, or its values. The control system 13 receives the necessary current information e.g. from the current detection circuit 7. If the control system 13 determines that the predetermined number of oscillation cycles has been reached, the control system 3 controls a switch from the third operating mode to the first operating mode.

The control of the switch from the third operating mode to the first operating mode occurs according to the embodiment of FIG. 3 by switching on the primary side switch 101 and on the secondary side 104 to 107 of the flyback converter 10 by leaving the secondary side switch 105 in the switched off state or by leaving the secondary side diode 105 in a deactivated state.

If the first operating mode starts after switching from the third operating mode, after the end of a blocking phase, the current flowing through the secondary side 104 to 107 of the flyback converter 10 is almost zero, since as already described there is practically no current flow. In this case there is no magnetization of the transformer in switching on the primary side switch 101 and the current on the primary side starts at zero, as this is also shown in FIG. 3 for the second cycle of the first operating mode. Due to parasitic capacities there can also be a short current peak in switching on the primary side switch 101, however, this current peak is ordinarily very short and therefore, in the interest of simplicity is not shown in FIG. 3. After the lapsing of the current peak, the primary side current flow along the dotted line would increase.

According to a further embodiment, the flyback converter 10 with respect to higher output currents (e.g. with respect to output currents, that are higher than an average current level), is operated in the first operating mode, i.e. in BCM mode and with respect to lower output currents (e.g. with respect to output currents, that are lower than an average current level) are operated in the second and/or in the third operating mode. The output current designates the current supplying the lighting means, for example the one or more light emitting diodes. According to this embodiment, the switch from the first operating mode to the second and/or third operating mode is performed in the case of the presence of a low or lower output current and the switch from the second and/or third operating mode to the first operating mode is performed in the case of the presence of a high or higher output current. The operation of the flyback converter 10 in the first, in the second or in the third operating mode is in the process performed as described above (see in particular the statements about FIGS. 2 and 3).

The flyback converter can also be operated in a mixed operation of all three operating modes. In the case of very high loads, for example operation only in the first operating mode can be selected, in the case of very low loads, the third operating mode can additionally be selected (following the first operating mode) and in the case of medium loads or in the load range between high and low load the second operating mode (following the first operating mode) can be selected.

Thus the invention also relates to a flyback converter 10 for operating one or more lighting means 12, wherein the flyback converter 10 is configured to be operated in a first operating mode, in a second or in a third operating mode, wherein the first operating mode is a boundary conduction mode, BCM mode, and wherein in the second or third operating mode of the flyback converter 10 the current flowing through the secondary side 104 to 107 of the flyback converter 11 flows in a negative direction at least some of the time. The invention also relates to a method for operating a flyback converter 10 and an operating device 1, which has the flyback converter 10.

Figure 4:
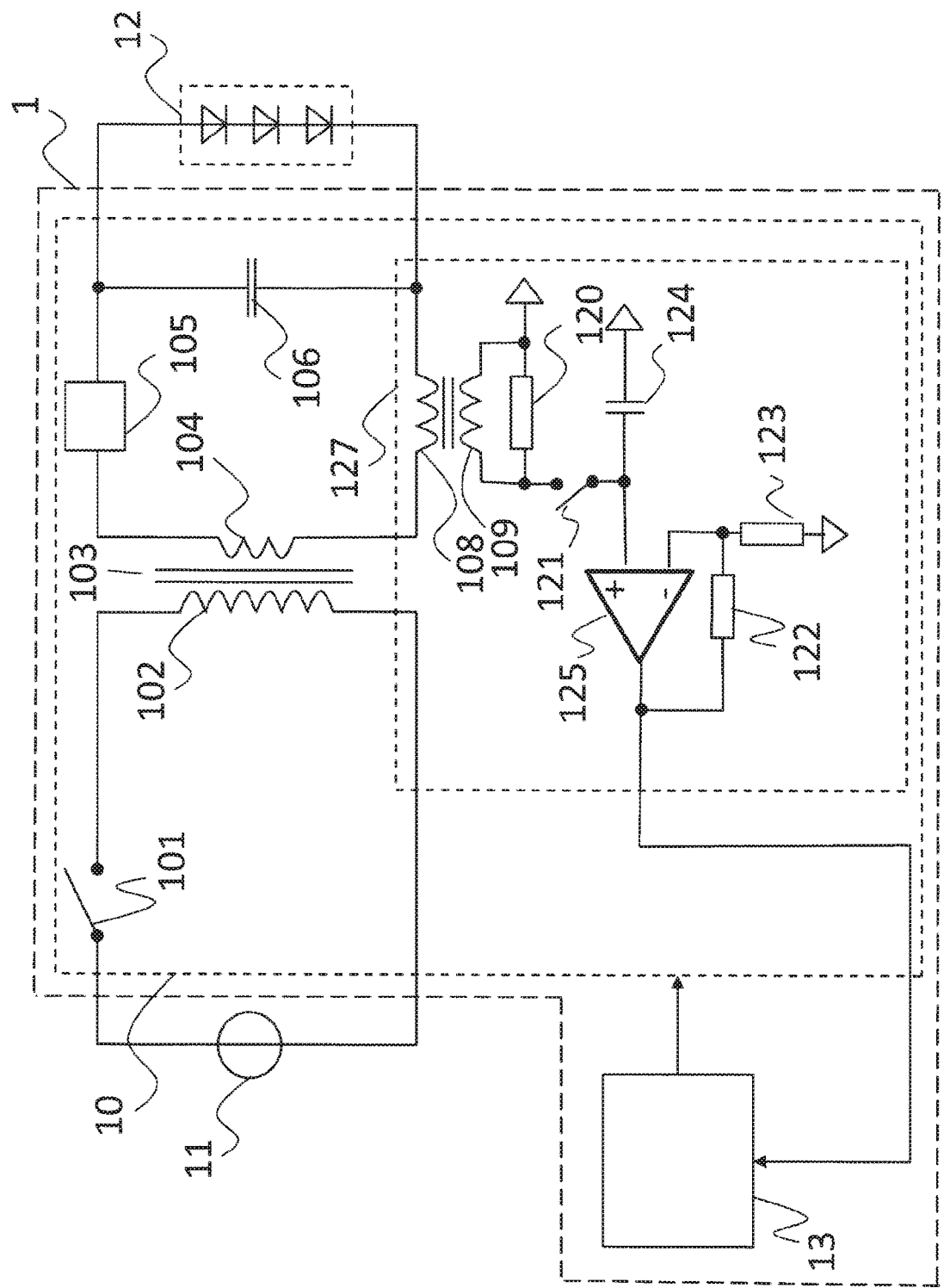
FIG. 4 shows a further embodiment of an operating device for operation of the lighting means according to one embodiment of the present invention.

FIG. 4 shows a further exemplary design of an operating device 1 for operating one or more lighting means 12 according to one embodiment of the present invention. This exemplary embodiment corresponds in relation to the implementation of the flyback converter 10 to the exemplary embodiment of FIG. 1 with the exception of the current detection circuit 127. This current detection circuit 127 differs from the current detection circuit 107, as will be explained. The operation of the flyback converter 10 in this example also corresponds to the examples explained in terms of FIGS. 1 to 3.

The current detection circuit 127 comprises a current detection transformer with the first winding 108 and the second winding 109. The first winding 108 of the current detection transformer is designed to detect the current flowing through the secondary side 104 to 127 and in particular through the lighting means 12. Preferably the current detection transformer with the first winding 108 and the second winding 109 is designed such that it can also work in linear operation in the case of maximum power output and/or maximum output current on the secondary side 104 to 127 with the lighting means 12 and cannot go into or close to the saturation region.

The first resonator 120 (also called terminating resistor or "burden resistor") of the current detection circuit 127 is arranged parallel to the second winding 109 in FIG. 4 as an additional element. When current flows through the second winding 109, a voltage curve develops on the first resonator 120, wherein the voltage runs proportional to the current through the second winding 109 via the first resonator 120.

The voltage determined via the first resonator 120 and hence the current detected from the second winding 109 is supplied to a sample and hold circuit, which can consist of the switch element 121 and the hold element 124, which can be formed by a capacitor. Preferably the switch element 121 is briefly closed in the switch-on phase of the primary side switch 101, as a result of which the applied voltage on the first resonator 120 is likewise applied to the hold element 124. Since the switch element 121 is only briefly closed and then opened again, preferably during the switch-off phase of the primary side switch 101 this applied voltage remains on the hold element 124 and can subsequently be evaluated as an output signal of the sample and hold circuit.

Since a direct current flows in the case of the flyback converter 10 on the secondary side 104 to 107, a detection of a changing direct current occurs through the current detection circuit 107 with the current detection transformer 108, 109. The measurement of such a direct current differs from the current measurement of an alternating current, as can be applied for example in the case of a resonant half-bridge converter. Since in the case of the flyback converter 10 a changing direct current flows on the secondary side 104 to 107, an offset value arises on average for the current detected on the secondary side winding 109 and hence for the voltage detected via the first resonator 120, since the mean value of the voltage on the first resonator 120 is unequal to zero. Considering the design of the current detection circuit 107, this offset value corresponds to the mean current on the secondary side 104 to 107 and hence the mean current through the lighting means 12.

The switching off of the secondary side switch 105 occurs in the switch from the second operating mode to the first operating mode. Since the current detection transformer 108, 109 is magnetized during the switch-on phase of the secondary side switch 105, and this magnetization is still present after the switching off of the secondary side switch 105, this magnetization can only dissipate via the first resonator 120. If this first resonator 120 is dimensioned sufficiently small, this magnetization of the current detection transformer 108, 109 will only dissipate slowly. This effect can be used to detect the voltage via the first resonator 120 with the sample and hold circuit in the switch-on phase of the primary side switch 101 subsequent to the switching off of the secondary side switch 105. Since the magnetization of the current detection transformer 108, 109 at the end of the switch-on phase of the secondary side switch 105 corresponds to the mean current on the secondary side 104 to 107, the mean current can be inferred therewith through the described detection by means of the sample and hold circuit.

The output signal of the sample and hold circuit is supplied to the positive input of an operational amplifier 125. The negative input of the operational amplifier 125 is coupled via a first amplifier resistor 122 or another amplifier element to the output of the operational amplifier 125. The negative input of the operational amplifier 125 is further coupled to ground via a second amplifier resistor 123. The operational amplifier 125 together with the first amplifier resistor 122 and the second amplifier resistor 123 forms an amplifier circuit. This amplifier circuit is configured as a non-inverting amplifier, wherein the two amplifier resistors 122 and 123 form a voltage divider, which is connected in the counter coupling. The ratio between the first amplifier resistor 122 and the second amplifier resistor 123 in the voltage divider determines the amplification factor of the amplifier circuit. Depending on the actual resistance value of the first resonator 120 the amplification factor of the amplifier circuit can be set in order to minimize or also optimize the influence of the first resonator 120 on the current detection.

Preferably the sample and hold circuit, with the switch element 121 and the hold element 124, and the amplifier circuit, with the operational amplifier 125, can be arranged as part of an integrated circuit, and for example can be integrated in the control system 13, in particular if the control system 13 is designed as an integrated circuit.

LIST OF REFERENCES 1 operating device
10 flyback converter
101 primary side switch
102 primary side winding
103 magnetic field
104 secondary side winding
105 secondary side switch or secondary side diode
106 capacitor
107 current detection circuit
108 first winding of the current detection circuit
109 second winding of the current detection circuit
110 first resonator of the current detection circuit
111 second resonator of the current detection circuit
112 offset current
113 third resonator of the current detection circuit
114 capacitor of the current detection circuit
11 voltage source or external current source
12 one or more lighting means (e.g. LEDs)
13 control system
120 first resonator of the current detection circuit
121 switch element of the current detection circuit
122 first amplifier resistor
123 second amplifier resistor
124 hold element
125 operational amplifier

The invention claimed is:

1. An operating device (1) for operating one or more lighting means (12), where the operating device has a flyback converter (10) for operating the one or more lighting means and a control system (13) configured to control the flyback converter (10), wherein the flyback converter (10) comprises:
    a transformer and the transformer is arranged between a primary side of the flyback converter (10) and a secondary side of the flyback converter (10), wherein the primary side has a primary side switch (101) and the secondary side has a secondary side switch (105) and the control system controls the operation of the flyback converter by controlling the primary side switch and the secondary side switch;
    a current detection circuit (107) that is configured to detect the current flowing through the secondary side of the flyback converter (10), said current detection circuit (107) having a current detection transformer (108, 109);
    wherein the flyback converter (10) is configured to operate in a conducting phase by switching on the primary side switch (101) and switching off the secondary side switch (105) such that current from a voltage source (11) flows through the primary side of the transformer and the transformer is charged, and to operate in a blocking phase by switching off the primary side switch (101) and switching on the secondary side switch (105) such that current from the voltage source (11) through the primary side to the transformer and the charging of the transformer are terminated and the current charged in the transformer flows through the secondary side, and the flyback converter (10) is configured such that the current flowing through the secondary side of the flyback converter (10) flows in a negative direction at least some of the time;
    wherein the flyback converter (10) is configured to be operated in a first operating mode that is a boundary conduction mode or in a second operating mode, wherein the first operating mode begins with a conducting phase and ends with a blocking phase, wherein in the blocking phase of the first operating mode the current flowing through the secondary side (104 to 107) of the flyback converter (10) drops towards zero, and in the second operating mode current flowing through the secondary side of the flyback converter (10) flows in a negative direction at least some of the time; and
    wherein the control system (13) controls the mode in which the flyback converter operates depending on the level of the detected current flowing through the secondary side of the flyback converter.

2. The operating device (1) according to claim 1, wherein the flyback converter (10) is configured to switch from the first operating mode to the second operating mode when the current flowing through the secondary side of the flyback converter (10) reaches the zero line.

3. The operating device (1) according to claim 1, wherein the flyback converter is further configured to operate optionally in a third operating mode, and wherein in a third operating mode the current flowing through the secondary side of the flyback converter (10) flows at least once first in the negative direction, then increases and subsequently drops towards zero, and the primary side switch (105) and the secondary side switch (101) are switched off in the third operating mode.

4. The operating device (1) according to claim 1, wherein in the second operating mode the current flowing through the secondary side of the flyback converter (10) flows in the negative direction to a lower limit.

5. The operating device (1) according to claim 1, wherein the flyback converter (10) is configured to switch from the second operating mode to the first operating mode when the flyback converter (10) has been operated for a predetermined duration in the second operating mode.

6. The operating device (1) according to claim 1, wherein the flyback converter is configured such that the flyback converter switches to the first operating mode by switching on the primary side switch (101) of the primary side of the flyback converter (10) and further by a switching off of the secondary side switch (105) of the secondary side of the flyback converter (10).

7. The operating device (1) according to claim 1, wherein in the first operating mode the dropping of the current flowing through the secondary side of the flyback converter (10) in the direction of the zero line is achieved by switching off the primary side switch (101) of the primary side of the flyback converter (10) and further by switching on the secondary side switch (105) on the secondary side of the flyback converter (10).

8. The operating device (1) according to claim 1, wherein in the second operating mode the primary side switch (101) of the primary side of the flyback converter (10) is in a switched off state.

9. The operating device (1) according to claim 1, wherein the current detection circuit is configured to feed in an offset current in the case of the detection of the current flowing through the secondary side of the flyback converter (10).

10. The operating device (1) according to claim 1, wherein the flyback converter (10) is configured such that the current flowing through the secondary side of the flyback converter (10) is provided for operating the one or more lighting means (12).

11. The operating device (1) according to claim 1, wherein the secondary side of the flyback converter (10) is configured to be connectable to the one or more lighting means (12) and in the presence of a connection to the one or more lighting means (12) is configured to supply the one or more lighting means (12) with the current flowing through the secondary side of the flyback converter (10).

12. The operating device (1) according to claim 1, wherein the one or more lighting means (12) comprise one or more light emitting diodes, LEDs.

* * * * *